United States Patent [19]

Petras et al.

[11] 4,061,826

[45] Dec. 6, 1977

[54] FLAME-RETARDANT PRESSURE-SENSITIVE ADHESIVE COMPOSITION

[75] Inventors: Raymond J. Petras, St. Paul; Gaylord L. Groff, North St. Paul, both of Minn.

[73] Assignee: Minnesota Mining and Manufacturing Company, St. Paul, Minn.

[21] Appl. No.: 699,786

[22] Filed: June 25, 1976

Related U.S. Application Data

[63] Continuation-in-part of Ser. No. 544,964, Jan. 29, 1975, abandoned.

[51] Int. Cl.² .......................... B32B 27/30; C09J 3/14
[52] U.S. Cl. .......................... 428/356; 260/45.95 G; 260/45.75 B; 260/45.7 RT; 428/355; 428/920; 428/921; 428/522; 428/480; 428/421; 428/422; 428/474; 428/442; 428/273; 428/285; 428/290
[58] Field of Search .............. 428/920, 921, 411, 522, 428/355, 356, 480, 474, 422, 421, 442, 273, 285, 290; 260/45.95 G, 45.75 B, 45.7 RL

[56] References Cited

U.S. PATENT DOCUMENTS

| 3,212,925 | 10/1965 | Rosenthal | 428/356 |
| 3,515,578 | 6/1970 | Tomita | 428/355 |
| 3,549,474 | 12/1970 | Lonning | 428/921 |
| 3,658,634 | 4/1972 | Yamagi | 428/373 |
| 3,839,140 | 10/1974 | Tyler | 428/373 |
| 3,922,459 | 11/1975 | Franz | 428/921 |

FOREIGN PATENT DOCUMENTS

| 1,100,605 | 1/1968 | United Kingdom | 428/921 |

*Primary Examiner* — Ellis Robinson
*Attorney, Agent, or Firm* — Cruzan Alexander; Donald M. Sell; Roger R. Tamte

[57] ABSTRACT

A flame-retardant pressure-sensitive adhesive composition that is compatible with enameled magnet wire is provided by adding to a base adhesive material certain halogenated organic compounds, such as decabromodiphenyl oxide, which exhibit little halogen or other loss upon exposure to elevated temperature.

15 Claims, No Drawings

FLAME-RETARDANT PRESSURE-SENSITIVE ADHESIVE COMPOSITION

REFERENCE TO RELATED APPLICATION

This application is a continuation-in-part of pending application Ser. No. 544,964, filed Jan. 29, 1975 now abandoned.

INTRODUCTION

When pressure-sensitive adhesive compositions are to be made flame-retardant, a halogenated organic compound is generally included in the composition; see Tomita et al, U.S. Pat. No. 3,515,578 and Rosenthal et al., U.S. Pat. No. 3,212,925. However, only a limited number of halogenated compounds will provide satisfactory results. The present invention arises from the uncovering of new problems with many halogen-containing compounds. One problem was uncovered by the use of commercial halogen-containing flame-retardant pressure-sensitive adhesive tapes to cover certain magnet-wire-wound components of electrical or electronic equipment. Such use was found to produce a high incidence of early failure of the insulation on the magnet wire, producing a short-circuit which ended the useful life of the component. This failure was traced to the halogenated organic compound in the pressure-sensitive adhesive composition, which apparently decomposed, especially at the high operating temperatures of some electrical equipment, producing species that migrated to the insulation and weakened it. A description of this problem, particularly with respect to polyvinyl chloride and neoprene, is found in a conference paper entitled "An Introduction to Compatibility of Insulation" by William B. Penn, submitted September, 1969 for an IEEE meeting in January, 1970.

A related kind of problem occurs with other halogen-containing compounds, which will not remain in the adhesive under some operating conditions for an electrical device. Within a short period of time at some contemplated operating temperatures, the halogen-containing compound, or a portion of it, vaporizes, leaving inadequate protection against combustion. Interestingly, such compounds do not always produce failure of insulation on magnet wire, apparently because they vaporize too quickly to cause a sufficiently long-term attack on the magnet wire insulation.

The present invention provides pressure-sensitive adhesive compositions that include halogenated organic compounds to produce lasting flame-retardancy at elevated temperatures but that can be used on magnet wire without inducing an early failure of the insulation. Briefly, an adhesive composition of the invention comprises (1) a base pressure-sensitive adhesive material that exhibits no more than about 3 weight-percent halogen loss after two weeks at 175° C, and (2) a flame-retarding amount of a halogenated organic compound that (a) is halogenated with either chlorine or bromine atoms that together constitute at least 40 weight-percent of the organic compound, (b) exhibits no more than about 1 weight-percent loss when heated to 200° C in a thermogravimetric analysis performed by raising the temperature of the organic compound from room temperature at a rate of 40° C/minute, (c) exhibits no more than about 3 weight-percent halogen loss and no more than about 10 weight-percent total loss after two weeks at 175° C and (d) comprises less than about 50 weight-percent of said adhesive composition.

By use of halogenated organic compounds as described, with their resistance to decomposition and low halogen loss at elevated temperature, it is found that the previous attack by flame-retarded pressure-sensitive adhesive tape on magnet wire insulation can be avoided. Yet the adhesive composition is flame-retardant, as measured, for example, by Underwriters' Laboratories Test UL 510. This combination of effectiveness as a flame-retardant and low halogen loss is surprising, since it is generally thought that flame-retardant compounds should decompose to release halogen at a low temperature, for example, below the combustion temperature of the base material to which the flame-retardant is added. The present invention does not follow such a guideline to obtain maximum flame-retardancy. Instead we have found that halogenated organic compounds having very little halogen loss at elevated temperatures, such as the known flame-retardant decabromodiphenyl oxide, will provide useful flame-retardancy in a pressure-sensitive adhesive composition while leaving the composition tacky, and at the same time be compatible with magnet wire.

DETAILED DESCRIPTION

The base pressure-sensitive adhesive material of a composition of the invention can be selected from a wide variety of materials. The pressure-sensitive adhesive material selected should be compatible with a desired halogenated organic compound to provide useful adhesion. (Compatibility sufficient for good adhesion is conveniently measured by mixing the desired halogenated organic compound and pressure-sensitive adhesive material and then testing the resulting adhesive material as follows: Two one-half-inch-wide strips of 3-mil polyethylene terephthalate film coated with the adhesive material being tested are arranged in longitudinal alignment with their adhesive surfaces together and with only a one-half-inch-length of one end of each of them overlapped; the overlapped end portions of the two strips are pressed together by rolling with a weighted roll in a typical manner. The assembly is then suspended by a hook attached to the free end of one of the strips, and a 1000-gram weight is suspended from a hook attached to the free end of the other strip to apply a shearing force to the adhesive bond. The time for the bond between the two strips to fail at room conditions, by complete separation of the tapes and falling of the weight, is a measure of the cohesive strength of the base adhesive material. The cohesive strength of a useful pressure-sensitive adhesive is at least 10 minutes in the described test, preferably at least 15 minutes, and even more preferably 60 minutes.)

In addition, the base adhesive material should not itself produce an undesired amount of halogen-containing volatiles upon heating, and should otherwise be compatible with magnet wire enamel, as defined herein. In general, as to the former requirement, the base adhesive material is satisfactory if it exhibits no more than about 3 weight-percent halogen loss after two weeks at 175° C.

One useful class of materials is the class of so-called rubber-resin adhesives, which comprise an elastomeric ingredient such as crude natural rubber, styrene-butadiene elastomer, polybutadiene, polyisobutylene, and polysiloxane, and a tackifying resin such as glyceryl esters of hydrogenated rosin, thermoplastic terpene resins, petroleum hydrocarbon resins; coumarone-indene resins; synthetic phenol resins; low-molecularweight polybutenes, and tackifying silicone resins. Some elastomers may be at least partially self-tackified, as when low-molecular-weight fractions tackify the high-molecular weight fractions of the elastomer. Generally, a tackifying resin is included in a proportion of 40 or 50 parts to 150 parts per 100 parts of base elastomer.

Another useful class of base pressure-sensitive adhesive materials comprises acrylate-based materials, which generally do not require the addition of tackifying resin, since the mass of acrylate-based polymer is tacky in itself. In general, the acrylate monomers from which the acrylate-based adhesive is formed have alkyl chains between about 1 and 14 carbon atoms per molecule, usually between 4 and 12 carbon atoms per molecule. A mixture of different acrylate monomers may be included, but at least a major portion of the alcohol residue forming the alkyl tails of the molecules generally have carbon-to-carbon chains of at least four carbon atoms terminating at the ester linkages. Examples of useful acrylate-based, tacky polymeric materials are homopolymers and copolymers of methyl isoamylacrylate, isooctyl acrylate, commercial fusel oil acrylate (in which 55-80 percent of the acrylates are esters of primary amyl alcohols, 15-45 percent esters of primary butyl alcohols, and 0-5 percent esters of n-propyl alcohol), and 2-ethyl hexylacrylate. The copolymers may also include such monomers as acrylic acid, metacrylic acid, acrylamide, methacrylamide, acrylonitrile, and methacrylonitrile.

The general characteristics for the halogenated organic compounds — which are typically halogenated with either chlorine or bromine — are listed above. As indicated there, the useful compounds generally include chlorine or bromine atoms in an amount that accounts for at least 40 weight-percent of the compound. Preferably, such atoms account for at least about 60 weight-percent of the compound.

Aromatic halogenated organic compounds are preferred, and halogenated polynuclear aromatic ethers such as decabromodiphenyl oxide are especially preferred. Such materials are effective as flame-retardants (and have been previously used as such) and may be included in compositions of the invention in useful flame-retarding amounts without eliminating the tackiness needed in a pressure-sensitive adhesive composition. Further, they show very little halogen loss upon heating to temperatures such as are experienced in the components of certain electrical or electronic equipment. Other useful halogenated organic compounds having the stable composition and low halogen loss called for by the present invention include hexabromobiphenyl, chlorinated terphenyl, hexabromobenzene, and perchloropentacyclodecane.

Besides having the stable composition and low halogen loss desired in the present invention, halogenated organic compounds used in the invention should be free of other agents that attack the magnet wire insulation, such as strongly acidic or alkaline agents. Significant concentrations of acids such as sulfuric or hydrochloric acid, which may be present in a compound as a result of a process of manufacture, should be avoided, for example.

A pressure-sensitive adhesive composition is regarded as satisfactorily flame-retarded, for purposes herein, when a tape in which it is included satisfies Underwriters' Laboratory Test UL 510. Typically, such flame-retardation calls for inclusion of at least about 2.5 weight-percent of halogenated organic compound in a pressure-sensitive adhesive composition of the invention; preferably a composition of the invention includes at least 10 weight-percent of halogenated organic compound. On the other hand, the pressure-sensitive adhesive composition generally includes less than about 50, and preferably less than about 40, weight-percent of the halogenated organic compound.

A pressure-sensitive adhesive composition of the invention can be applied to a variety of tape backings. For a particularly flame-resistant tape, the backing may be glass cloth. Other useful backings include films of polyethylene terephthalate, polytetrafluoroethylene, polyimide, or polyvinyl fluoride, and fibrous webs which may or may not be impregnated with a polymeric material. The adhesive composition can be applied to the backing — usually from solution, but also by hot-melt coating, extrusion, or lamination of a preformed film from a release liner — in a variety of thicknesses ranging from at least 0.2 to 5 mils (5 to 125 micrometers) sufficient to provide the desired adhesion. Generally an adhesive composition of the invention will provide, when applied in a 5-mil-thickness onto a polyester film backing, for example, at least 20 ounces of adhesion to steel per inch width when measured fresh according to ASTM D 1000 (about 200 grams/centimeter width).

Besides the halogenated organic compound, an adhesive composition of the invention may include other additives such as pigments or fillers. A particularly useful filler, which appears to provide synergistic flame-retarding effects in compositions of the invention, is antimony oxide.

The invention will be further illustrated by the following examples.

EXAMPLE 1

The following ingredients were milled together in a ball mill:

|  | Parts by Weight |
|---|---|
| Terpolymer consisting of isooctyl-acrylate (93.75 weight-percent) acrylic acid (6 weight-percent) and glycidyl methacrylate (0.25 weight-percent) | 100 |
| Antimony trioxide (Red Star from National Lead; contains at least 99 weight-percent antimony trioxide) | 6 |
| Decabromodiphenyl oxide (which includes 81 weight-percent bromine) | 22 |
| Titanium dioxide | 22 |
| Mixture of heptane and ethyl acetate solvents | 312 |

The resulting adhesive was coated onto a one-mil-thick (25 micrometer-thick) primed film of polyethylene terephthalate. The coating was dried 120 seconds at 125° F (50° C), 130 seconds at 180° F (80° C) and 120 seconds at 235° F (112° C). Upon drying, there were 11 grains of adhesive per 24 square inches (4.6 milligrams per square centimeter).

After being slit into rolls, the tape was tested for flame resistance by Underwriters' Laboratory test UL 510, and it passed the test.

Compatibility of the tape with a magnet wire was then measured by a test which is regarded herein as a standard for compatibility. In this test a twisted wire pair as shown in ASTM D 2307-68 is prepared using polyurethane-coated magnet wire. The twisted wire pair is laid against one strip of the tape, and another strip is laid over the wire pair, with the adhesive layers of both strips in contact with one another. This assembly is aged two weeks at 175° C, after which an alternating-current voltage of 500 volts is applied across the twisted wires. Failure of the test is represented by a short circuit. Three samples of the tape of this example were tested and all three passed.

The adhesion of the tape was measured according to ASTM D-1000, both after the tape was fresh and after it had been aged in roll form 7 days at 120° F (50° C). The adhesion measured was 34 ounces per inch width (377 grams per centimeter width) on the fresh tape and 30 ounces per inch width of tape (333 grams per centimeter) for the aged tape.

EXAMPLE 2

The following ingredients were mixed and heated in a mogul mixer to partially react them.

| | Parts by Weight |
|---|---|
| Natural rubber | 100 |
| Fine-sized zinc oxide (Kadox 15 made by New Jersey Zinc) | 3 |
| Tri basic calcium phosphate | 6.8 |
| Hexabromobiphenyl, which includes 75 weight-percent bromine | 46.3 |
| Heat-treated wood rosin having a melting point of 74° C, an acid number of 151, and a saponification number of 157; the unsaponifiable ingredients comprising 16 weight-percent of the rosin | 20 |
| Polyterpene polymer of the pinene type softening at 115° C (Piccolyte S-115) | 60 |
| Antimony trioxide | 14.4 |
| Oil-soluble heat-reactive phenol-formaldehyde resin based primarily on tertiary butyl phenol (Union Carbide CKR164) | 20 |
| 4-4 thio-bis [6 tert-butyl meta cresol] | 2 |

The ingredients were then dissolved in 438 parts of heptane. This adhesive composition was coated onto 1-mil-thick (25-micrometer-thick) polyethylene terephthalate film and dried as described in Example 1. The adhesive layer had a weight of ten grains per 24 square inches (4.2 milligrams per square centimeter). After being slit into rolls the tape was tested in the manner described in Example 1. The tape passed the flame-resistance test, passed the test for compatibility with magnet wire, and exhibited 36 ounces per inch width of adhesion (399 gram per centimeter) when fresh and 40 ounces per inch width (444 gram per centimeter) when aged.

EXAMPLES 3-5

Example 2 was repeated except that the hexabromobiphenyl was replaced with a different flame-retarding agent, and polyterpene resin was omitted in Example 3. The flame-retarding agent used in each example is shown in Table I, and the results of the tape prepared are also shown.

EXAMPLE 6

The following ingredients were mixed in a ball mill for 48 hours.

| | Parts by Weight |
|---|---|
| Silicon resin containing functional hydroxyl groups dissolved at 60 percent solids in xylene to give a viscosity of 12 to 17 centipoises (CR-524A from General Electric Corp.) | 900 |
| Calcium phosphate (tribasic) | 46.4 |
| Decabromodiphenyl oxide | 291 |
| Antimony trioxide | 98 |
| Cerous neodecanate antioxidant | 1.94 |

The resulting slurry was transferred to another container and the ball mill washed twice, each time with 150 parts of toluene. Both washes were added to the slurry.

TABLE I

| Ex. No. | Flame Retarding Agent Name | Parts by Weight | Test for flame-resistance | Compatibility with polyurethane-coated magnet wire | Adhesion Fresh Ounce per Inch | Adhesion Fresh Gram per Centimeter | Adhesion Aged Ounce per Inch | Adhesion Aged Gram per Centimeter |
|---|---|---|---|---|---|---|---|---|
| 3 | Mixture consisting mostly of chlorinated terphenyls (60 weight-percent chlorine; Arochlor 5460 from Monsanto) | 129 | passes | passes | 35 | 388 | 44 | 488 |
| 4 | Hexabromobenzene (87 weight-percent bromine) | 42.5 | passes | passes | 34 | 377 | 28 | 311 |
| 5 | Perchloropent-acyclodecane (69 weight-percent chlorine) | 102 | passes | passes | 27 | 299 | 21 | 233 |

In addition, 500 parts of a silicone gum having a high phenyl content (CR-525B from General Electric Corp.) was thoroughly mixed in the slurry. Just before coating of the mixture, a solution of 16 parts of benzoyl peroxide dissolved in 160 parts of toluene was thoroughly mixed into the slurry. Tape was prepared by coating this adhesive composition onto glass cloth (an electrical grade glass cloth made from continuous glass filaments, plain weave; Style 1131). The cloth was 5.4 mils (0.137 millimeter) thick after coating, the adhesive composition was dried 200 seconds at 190° F (90)C) and cured 320 seconds at 350° F (175° C). The resulting adhesive layer was 39.4 grains per 24 square inches (16.5 milligrams per square centimeters). The tape was then slit into rolls and tested in the manner described in Example 1. The tape passed the flame-resistance and compatibility tests, and it exhibited 40 ounces per inch width adhesion (444 grams per centimeter), both when fresh and when aged.

COMPARATIVE EXAMPLE A AND EXAMPLES 7-8

Comparative Example A was prepared by following Example 2 except that the hexabromobiphenyl and the antimony oxide were omitted, and the adhesive composition was coated on glass cloth. Example 7 was like Comparative Example A except that it included in addition 4.2 parts by weight of decabromodiphenyl oxide, 9.55 parts of hexabromobiphenyl, and 4.4 parts of antimony oxide. Example 8 was like Comparative Example A except that it included 232 parts of decabromodiphenyl oxide, and the adhesive coated on one-mil-thick polyethylene terephthalate film.

When tested as described in Example 1, Comparative Example A failed in the flame-resistance test. It continued to burn for 108 seconds until all the adhesive was consumed. Examples 7 and 8 both passed the flame-resistance test. Those examples also passed the test for compatability with magnet wire. Adhesion of the examples was: For Comparative Example A, 24 ounces per inch width (266 grams per centimeter) when fresh and 15 ounces per inch width (166 grams per centimeter) when aged; for Example 7, 28 ounces per inch width (311 grams per centimeter) when fresh and 24 ounces per inch width (266 grams per centimeter) when aged; for Example 8, 38 ounces per inch width (421 grams per centimeter when fresh and 24 ounces per inch width (266 grams per centimeter) when aged.

COMPARATIVE EXAMPLES B AND C

Example 2 was repeated except that in place of the hexabromobiphenyl, the ingredients used in Table II were used. Results are as given in Table II.

Although Comparative Example B passes the compatibility test it is judged to be marginal in that capacity and would not be expected to give consistently satisfactory results.

The various halogenated organic compounds of Examples 1-8 and Comparative Examples B and C were tested by thermogravimetric analysis using a temperature cycle in which there was an increase in temperature of 40° C per minute. The weight loss is shown in Table III. That table also shows the total weight loss from the tested compound in percent after two weeks at 175° C and shows the halogen loss in percent of initial halogen after two weeks at 175° C. Halogen loss was measured by an oxyhydrogen flame-decomposition test adapted from the Wickbold method as described in Angew. Chem., volume 64, page 133, 1952. A second halogen-loss column is included to show the maximum amount of halogen-loss that could have occurred, since the values of the halogen in each determination can have an error of ±1 percent of the halogen content.

TABLE II

| Example No. | Flame-Retarding Agent | | Test for flame resistance | Compatibility with polyurethane magnet wire | Adhesion | | | |
|---|---|---|---|---|---|---|---|---|
| | | | | | Fresh | | Aged | |
| | Name | Parts by Weight | | | (Ounce per inch) | Gram per centimeter | (Ounce per inch) | (Gram per centimeter) |
| Comparative Ex. B | Tetrabromobisphenol A (58 weight-percent bromine) | 57.5 | passes | passes | 31 | 344 | 30 | 333 |
| Comparative Ex. C | Hexabromocyclododecane (75 weight-percent bromine) | 42.5 | passes | fails | 37 | 410 | 32 | 355 |

TABLE III

| Ex. No. | Thermogravimetric Analysis | | | | | | Percent Weight Loss for two Weeks at 175° C (percent) | Halogen Loss After Two Weeks (percent) | |
|---|---|---|---|---|---|---|---|---|---|
| | 1% | 5% | 10% | 50% | 80% | 100% | | (as measured) | (assuming maximum cumulative error in measurement) |
| 1 | 240° C | 284° C | 408° C | 460° C | 480° C | | 0.04 | 0.7 | 2.3 |
| 2 | 210° C | | 280° C | | | | 6.99 | 0 | 1.5 |
| 3 | 210° C | 240° C | 260° C | 310° C | 338° C | | 2.07 | 0 | 1.0 |
| 4 | 240° C | 267° C | 374° C | 408° C | 448° C | | 4.68 | 1 | 2.7 |
| 5 | 210° C | 235° C | 244° C | 273° C | | 300° C | 3.01 | 0.1 | 1.5 |
| Comparative Ex. B | 212° C | 235° C | 250° C | 290° C | 440° C | | 10.97 | 2.7 | 3.8 |
| Comparative Ex. C | 88° C | 234° C | 248° C | 263° C | 308° C | | 78.76 | 59.3 | 60.1 |

COMPARATIVE EXAMPLE D

Neoprene, which is an elastomer having flame-retardant properties and which is often used an an ingredient in a rubber-resin pressure-sensitive adhesive tape or in a tape backing, was tested for weight loss during heat-aging and for magnet-wire compatibility. The test sample for the heat-aging test was prepared by dissolving one part of the neoprene in two parts of methyl ethyl ketone, spreading the solution onto a glass cloth, drying the glass cloth (in air and then in a 120° F oven for 5 minutes), and then placing two segments of the coated glass cloth in the heat-aging oven. After one week at 175° C, the samples had lost 41.8 and 43.2 percent of their initial weight, and after two weeks they had lost 54.8 and 54.2 percent. Compatibility was measured by coating a solution of neoprene which also contained a small amount of pressure-sensitive adhesive onto a tape backing, drying the coating, and using the resulting tape in the described twisted-wire compatibility test. The sample failed in the test.

As a further illustration of the background from which the invention proceeds, a number of commercial flame-retardant agents that have been tested and found to provide too high a weight loss in the heat-aging test are listed in Table IV. It may be noted that tris-(2,3 dibromopropyl)phosphate, a preferred flame-retardant agent for pressure-sensitive adhesives as taught in the Tomita et al patent noted above, is one of the materials that exhibits high weight loss at 175° C., which is unacceptable in pressure-sensitive adhesives of the present invention.

Although the attack by prior art flame-retardant pressure-sensitive adhesive compositions has been principally on polyurethane-insulated magnet wire, and the test for compatibility herein uses polyurethane-insulated magnet wire, adhesive compositions of the invention are useful with other kinds of insulated wire also. For example, the composition of Example I above passed the described compatibility test, except that different wires insulated respectively with polyvinyl formal, polyester, polyimide and polyesterimide wire enamels replaced the polyurethane-insulated wire.

TABLE IV

| Flame-Retardant Agent | Percent Weight Loss at 175° C (percent) | |
|---|---|---|
| | After 1 Week | After 2 Weeks (16 days) |
| 1. Pentabromochlorocyclohexane (Dow - FR-651A) | 41.8 | 67.1 |
| 2. Dibromopentyl glycol (Dow - FR-1138) | 75.7 | 80.6 |
| 3. Dibromopentylglycol alkyl Concentrate (Dow - FR-1540) | 18.6 | 19.7 |
| 4. BCE Hexabromide (Chemtron Fireshield B-1) | 88.0 | 88.1 |
| 5. Dibromobutenediol (GAF) | 76.8 | 77.7 |
| 6. 2,3 Dibromopropyl acrylate (Great Lakes AE-59) | 46.7 | 60.0 |
| 7. 2,3 Dibromopropyl methacrylate (Great Lakes ME-56) | 26.1 | 62.4 |
| 8. Halby-Flameout 5600B1 | 46.3 | 84.1 |
| 9. Phosphate ester (Monsanto Phosgard 2XC-20) | 41.8 | 45.7 |
| 10. Hexabromobutene-2 (Tennco) | 92.9 | 93.2 |
| 11. Tris-(2,3-dibromopropyl) phosphate (Firemaster T 23P from Michigan Chemical) | | 82.6 (14 days) |

What is claimed is:

1. A flame-retardant pressure-sensitive adhesive composition for use on electrically insulating tape that is compatable, as defined herein, with magnet wire insulation, said adhesive composition providing, when applied in a 5-mil-thickness on a polyester film backing, at least 20 ounces of adhesion to steel per inch width, and said adhesive composition comprising (1) a base pressure-sensitive adhesive material that exhibits no more than about 3 weight-percent halogen loss after weeks at 175° C and (2) at least 2.5 weight-percent of halogenated organic material that (a) is halogenated with either chlorine or bromine atoms that together constitute at least 40 weight-percent of the organic material, (b) exhibits no more than about 1 weight-percent loss when heated to 200° C in a thermogravimetric analysis performed by raising the temperature of the organic material from room temperature at a rate of 40° C/minute, (c) exhibits no more than about 3 weight-percent halogen loss after two weeks at 175° C, (d) exhibits less than 10 percent loss in overall weight after two weeks at 175° C and (e) comprises less than about 50 weight-percent of said adhesive composition.

2. An adhesive composition of claim 1 in which said halogenated organic material exhibits no more than about 1 weight-percent halogen loss after two weeks at 175° C.

3. An adhesive composition of claim 1 in which said halogenated organic material includes a polynuclear aromatic ether.

4. An adhesive composition of claim 1 in which said halogenated organic material includes decabromodiphenyl oxide.

5. An adhesive composition of claim 1 which further includes antimony trioxide.

6. An adhesive composition of claim 1 in which said halogenated organic material is halogenated with either chlorine or bromine atoms that together constitute at least 60 weight-percent of the organic material.

7. An adhesive composition of claim 1 in which said halogenated organic material comprises at least 10 weight-percent of the composition.

8. An adhesive composition of claim 1 in which said base pressure-sensitive adhesive material is an acrylate-based pressure-sensitive adhesive.

9. A pressure-sensitive adhesive tape comprising a flexible backing and at least one layer of the adhesive composition of claim 1 united to the backing.

10. An adhesive composition of claim 1 in which said halogenated organic material includes a mixture of different halogenated organic compounds.

11. An adhesive composition of claim 1 in which said halogenated organic material comprises a compound selected from the group consisting of decabromodiphenyl oxide, hexabromobiphenyl, chlorinated terphenyl, hexabromo-benzene, and perchloropentacyclodecane.

12. A flame-retardant electrically insulating pressure-sensitive adhesive tape which is compatible, as defined herein, with magnet wire insulation and exhibits at least 20 ounces of adhesion to steel per inch width, comprising a flexible backing and at least one layer of pressure-sensitive adhesive composition united to the backing, said adhesive composition comprising (1) a base pressure-sensitive adhesive material that exhibits less than about 3 weight-percent halogen loss after two weeks at 175° C, (2) at least 2.5 weight-percent of halogenated polynuclear aromatic ether that (a) is halogenated with either chlorine or bromine atoms that together constitute at least 40 weight-percent of said ether, (b) exhibits less than 1 weight-percent loss when heated to 200° C in a thermogravimetric analysis performed by raising the temperature of said ether from room temperature at a rate of 40° C/minute, (c) exhibits less than about 3 weight-percent halogen loss after two weeks at 175° C, (b) exhibits less than 10 percent loss in overall weight after two weeks at 175° C, and (e) comprises less than about 50 weight-percent of said adhesive composition, and (3) antimony trioxide.

13. A tape of claim 12 in which said base pressure-sensitive adhesive material comprises an acrylate-based pressure-sensitive adhesive.

14. A tape of claim 12 in which said halogenated ether comprises decabromodiphenyl oxide.

15. A flame-retardant electrically insulating pressure-sensitive adhesive tape which is compatible, as defined herein, with magnet wire insulation and exhibits at least 20 ounces of adhesion to steel per inch of width comprising a flexible backing and at least one layer of pressure-sensitive adhesive composition united to the backing, said adhesive composition comprising an acrylate-based pressure-sensitive adhesive and 10 to 50 weight-percent of decabromodiphenyl oxide.

* * * * *

UNITED STATES PATENT AND TRADEMARK OFFICE
CERTIFICATE OF CORRECTION

PATENT NO. : 4,061,826
DATED : December 6, 1977
INVENTOR(S) : Raymond J. Petras and Gaylord L. Groff It is certified that error appears in the above-identified patent and that said Letters Patent are hereby corrected as shown below:

In column 3, line 28, "metacrylic" should be --methacrylic--.

In column 7, line 42, "compatability" should be --compatibility--.

In column 9, line 37, "compatable" should be --compatible--.

In column 9, line 43, "after weeks" should be --after two weeks--.

In column 10, line 45, "(b)" should be --(d)--.

Signed and Sealed this

Sixteenth Day of May 1978

[SEAL]

Attest:

RUTH C. MASON
Attesting Officer

LUTRELLE F. PARKER
Acting Commissioner of Patents and Trademarks